C. W. STARRETT, DEC'D.
M. L. STARRETT, EXECUTRIX.
CHEESE LOAF.
APPLICATION FILED FEB. 17, 1913.
1,122,548.
Patented Dec. 29, 1914.
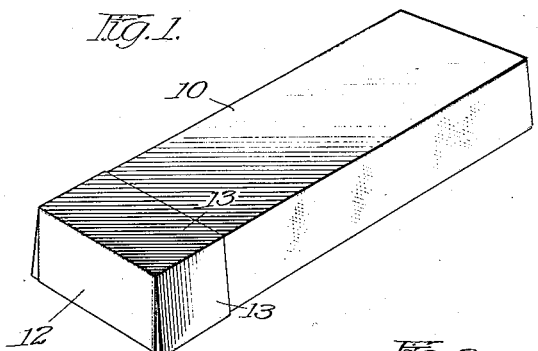
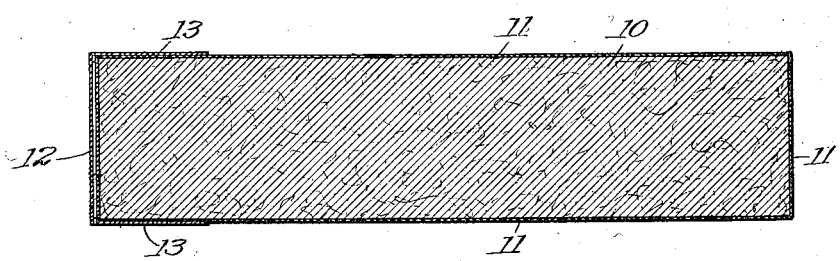
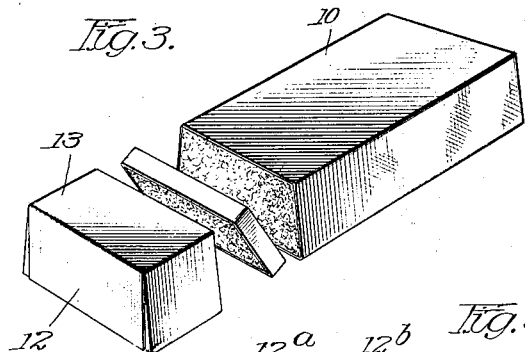
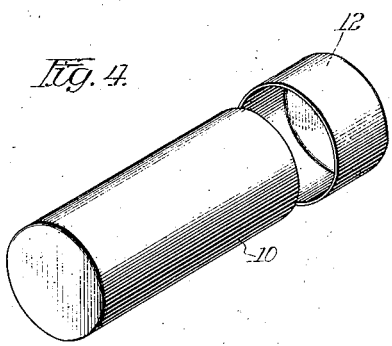
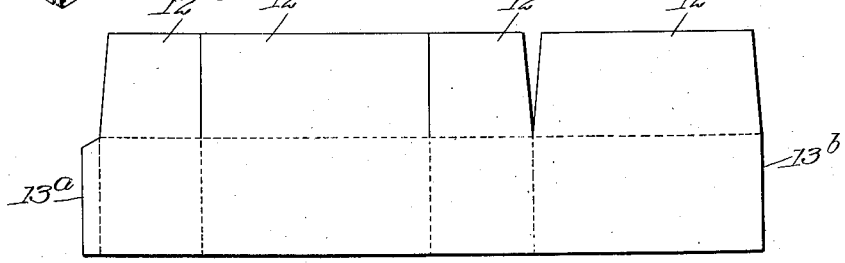
Witnesses:
Robert H. Weir
E. E. Kane
Inventor
Clifford W. Starrett
by Jones Addington Ames & Seibold
Attys.

UNITED STATES PATENT OFFICE.

CLIFFORD W. STARRETT, OF PLYMOUTH, WISCONSIN; MAUD L. STARRETT EXECUTRIX OF SAID CLIFFORD W. STARRETT, DECEASED.

CHEESE-LOAF.

1,122,548.         Specification of Letters Patent.         Patented Dec. 29, 1914.

Application filed February 17, 1913. Serial No. 748,990.

*To all whom it may concern:*

Be it known that I, CLIFFORD W. STARRETT, a citizen of the United States, residing at Plymouth, in the county of Sheboygan and State of Wisconsin, have invented new and useful Improvements in Cheese-Loaves, of which the following is a full, clear, concise, and exact description, reference being had to the accompanying drawing, forming a part of this specification.

The ordinary American cream cheese of commerce is molded into large sized blocks and is sold to consumers in small wedge-shaped slices cut therefrom by the grocer or retail dealer. This method of handling the cheese is subject to many objections. On the retailer's counter it is an object of attack by flies and vermin generally. When the block is cut the fresh cheese is exposed and tends to dry out and become hard and stale. The same thing happens to the cheese slices or wedges of cheese in the hands of the consumer. The latter, therefore, buys in small quantities, usually only so much as can be readily consumed in a short time and before it greatly deteriorates. If there is an excess it dries out and becomes hard and stale and is usually wasted. As a result, the consumption of cheese is more or less restricted, although it is acknowledged to be a valuable food product.

It is the object of my invention to provide a cheese loaf of such a character that these objections are entirely overcome and the sanitary handling of the cheese is practically necessitated. The consumer is enabled to buy in as large a quantity as desired, and although used only as needed the remainder will remain fresh, untainted and in as good condition as when first purchased. Thus the use of wholesome cheese is promoted and waste is eliminated.

My invention is illustrated in the accompanying drawing, wherein—

Figure 1 is a perspective view of one embodiment thereof; Fig. 2 is a longitudinal cross-sectional view thereof; Fig. 3 illustrates in perspective the manner in which the cap is removed from the loaf and a slice of cheese cut therefrom; Fig. 4 is a perspective view of a cylindrical form of cheese loaf; and Fig. 5 shows a blank from which the cap of the loaf of Fig. 1 may be made.

Referring to Figs. 1 to 3, the numeral 10 designates a loaf of cheese which is formed by the usual or the desired process and is preferably substantially rectangular in cross-section. The cross section of the loaf is maintained substantially uniform through its length and the loaf is preferably straight from end to end. The sides of the mold in which the loaf is formed are slightly inclined, to enable the loaf to be readily removed therefrom. This loaf may be of any desired size and weight but is preferably of a size for family use—about ten pounds. Its surface is protected with the usual cheese-cloth cover 11 and outer layer or rind. On one end of the loaf is fitted a suitable protecting cap. This cap has the end or bottom member 12 fitting over the end of the loaf and protecting the same, and the side members 13 which closely fit and extend for some distance along the sides of the loaf, as indicated. This cap may be made in any desired way or of any suitable material, as for example, paper, pasteboard, tin, or the like. I prefer to make it of pasteboard which is impregnated or coated on the inner side with paraffin or some suitable moisture and germ-proof substance.

As indicated in Fig. 5, a convenient way of making the cap is to form a blank of the form shown from the sheet material, then by suitably folding on the dotted lines and pasting the overlapping end flaps $12^a$, $12^b$, $12^c$ and $12^d$ together, to form the end member 12, and the side flap $13^a$ to the edge $13^b$, which it overlaps, the cap is readily formed of the proper size and dimensions to snugly slip over the end of the loaf 10. This cap is then thoroughly coated on the inside with paraffin. The paraffin coating renders the cap air, moisture and germ tight, and when the cap is in place on the loaf causes its sides 13 to snugly grip the corresponding sides of the loaf with a sealing engagement, thereby preventing the cap's unintentional dislodgment from the end of the loaf and effectually sealing against the entrance of moisture, air, vermin, etc., to the end of the loaf. When it is desired to use the cheese, the cap is slipped off the end and as much as desired is sliced from the end of the loaf. The cap is then slipped back on the cut end of the loaf, and protects the latter from drying out or becoming stale, and from the attack of flies, etc. The substantially uniform cross-section of the loaf throughout its length, and also its comparatively straight sides, permit the cap to snugly slip and fit over the cut end of the loaf at all points throughout its length as it is cut away. The cut end of the cheese, therefore, remains indefinitely in as good condition as when freshly cut, and the entire cheese loaf may be thus consumed as needed in the household. There is no waste, as the entire loaf may be consumed, and only so much as is required at any particular time need be cut. At the same time, the individual is enabled to keep on hand a sufficient quantity to meet all demands without the danger of having a quantity left on hand to spoil.

By the term "cheese loaf" as herein used, I contemplate a completely formed cheese, preferably as it comes from the mold with the usual protecting rind and cloth covering or other suitable protecting exterior, and which is substantially uniform in cross-section from end to end and of such configuration that as the cheese is sliced off the end of the loaf, the cap may readily be slipped over the cut end of the remainder of the loaf and snugly fit thereon to protect it as described until the loaf is completely used up.

In Fig. 4 I have shown a cylindrical loaf and cap, which is otherwise the same as in the case of Fig. 1. While I have shown the side walls of the cap 13 straight and smooth, it is obvious that they may be otherwise formed and still provide a protecting cap in accordance with the invention. Various other changes, alterations and substitutions may be made without departing from the invention as defined in the appended claims.

I claim:

1. A cheese loaf of substantially uniform cross section throughout its length, having a readily removable and replaceable protecting cap fitting snugly over one end of the loaf, said cap being readily removable to permit slices of cheese to be cut from the end of the loaf and being readily replaceable to protect the freshly cut end of the loaf, and said cap fitting snugly over the cut end of the loaf at all points throughout the length of the remainder of the loaf as it is cut away.

2. A cheese loaf of substantially uniform cross section throughout its length, having a readily removable and replaceable protecting cap fitting snugly over one end of the loaf, said cap having a moisture proof coating on its inner side and being readily removable to permit cheese to be cut from the end of the loaf and readily replaceable to protect the freshly cut end of the loaf, said cap fitting snugly over the cut end of the loaf as its length is shortened.

3. A cheese loaf of substantially uniform cross section throughout its length, having a readily removable and replaceable protecting cap fitting snugly over one end of the loaf, said cap having a moisture proof coating of paraffin on its inner side and being readily removable to permit cheese to be cut from the end of the loaf and readily replaceable to protect the freshly cut end of the loaf, said cap slipping snugly over the cut end of the loaf as its length is shortened.

4. A cheese loaf of substantially rectangular cross section and of uniform size throughout its length, said loaf having a cap of similar cross-section and size adapted to be slipped on and off the end of the loaf and fitting snugly over the end and along the sides thereof, said cap having an inner coating of paraffin and adapted to fit snugly over the end of the loaf at any point at which it may be cut away.

In witness whereof, I have hereunto subscribed my name in the presence of two witnesses.

CLIFFORD W. STARRETT.

Witnesses:
ARTHUR L. FOULKER,
CLARKE W. JACKSON.